United States Patent [19]

Dolikian et al.

[11] 4,242,753
[45] Dec. 30, 1980

[54] RADIO TRANSMITTER TIME OUT TIMER

[75] Inventors: Arman V. Dolikian, Palatine; Thomas A. Freeburg, Arlington Heights, both of Ill.

[73] Assignee: Motorola, Inc., Schaumburg, Ill.

[21] Appl. No.: 882,519

[22] Filed: Mar. 1, 1978

[51] Int. Cl.³ .................... H04B 1/04; H04L 27/04
[52] U.S. Cl. .................................... 375/70; 375/71; 455/115; 455/116; 455/117
[58] Field of Search ........ 325/166, 164, 169, 161–163, 325/170, 2, 187, 31, 64, 55, 133; 179/2 DP, 2 EB, 1 VC; 307/232, 233 R, 234; 331/173; 455/92, 116, 127, 79–82, 115, 117; 375/68–71

[56] References Cited

U.S. PATENT DOCUMENTS

| | | | |
|---|---|---|---|
| 3,191,066 | 6/1965 | Staudenmayer | 455/79 |
| 3,230,454 | 1/1966 | Van Burkleo | 325/187 |
| 3,328,696 | 6/1967 | Schünemann | 455/117 |
| 3,469,191 | 9/1969 | Russell, Jr. et al. | 325/166 |
| 3,500,458 | 3/1970 | Cannalte | 325/166 |
| 3,500,459 | 3/1970 | Battin et al. | 325/166 |
| 4,034,297 | 7/1977 | Giorgi et al. | 325/166 |
| 4,117,348 | 9/1978 | Newman | 307/232 |

*Primary Examiner*—Marc E. Bookbinder
*Attorney, Agent, or Firm*—James A. Scheer; James W. Gillman

[57] ABSTRACT

A mobile data terminal system is capable of voice or microprocessor controlled data transmission over a keyed transmitter. The improved timer apparatus disables further transmission if the transmission duration or the average duty cycle over a predetermined time period of repeated transmitter keying exceed predetermined limits. Where the disable mode resulted from a microprocessor fault, the transmitter continues to be disabled until the microprocessor is reset.

3 Claims, 2 Drawing Figures

RADIO TRANSMITTER TIME OUT TIMER

BACKGROUND OF THE INVENTION

The present invention pertains to the radio communication art and, more particularly, to an improved time out timer for a radio transmitter.

Time out timers are well known in the radio communication art, and, particularly, communications systems wherein a plurality of mobile stations share a limited number of available radio channels. In such systems, a mobile user can tie up a channel either through intentional continuous transmission or through unintentional transmitter activation or equipment failure. In an attempt to minimize or eliminate this problem, time out timers have been employed which sense the duration of a transmission and disable the transmitter if the transmission duration exceeds a predetermined limit.

With the advent of mobile data terminals, especially those which process and transmit data via the control of a microprocessor, it has been found that a mobile transmitter can tie up a communication channel despite the incorporation of a conventional time out timer. Here, the microprocessor can go into a failure mode whereby the transmitter is keyed at a high repetition rate. Thus, a conventional time out timer which only responds to continuous transmission does not correct such a fault.

In addition, it is desirable to maintain the transmitter disabled until such time as the microprocessor is reset or reinitialized.

Further, it is desirable to disable transmission during the power out interval of the microprocessor since its output during this interval is unpredictable.

SUMMARY OF THE INVENTION

It is an object of this invention, therefore, to provide improved radio transmitter timer apparatus which is operable to disable the transmitter if the average duty cycle, over a period of repeated transmitter keying, exceeds a predetermined limit.

It is a further object of this invention to provide the above described improved time out timer in a microprocessor controlled data terminal wherein the transmitter is disabled until such time that the microprocessor is reset or reinitialed.

It is a further object of the invention to provide the above improved time out timer in a microprocessor controlled data terminal wherein the transmitter is disabled during the interval of microprocessor initialization at system power up.

Briefly, according to the invention, an improved time out timer is provided for a radio transmitter, which transmitter is both actuated and disabled by suitable control signals. The improved time out timer comprises repetition rate disable apparatus which automatically disables the transmitter in response to the transmitter being actuated multiple times of predetermined average duty cycle within a predetermined time interval.

In a data transmission system employing logic means and a reset means to reset or reinitialize the logic means, the improved time out timer further comprises apparatus for maintaining the transmitter in the disabled mode until the generation of a reset signal.

Further, the disable means includes means for disabling the transmitter during the power up interval of the logic apparatus.

DETAILED DESCRIPTION OF THE PREFERRED EMBODIMENT OF THE INVENTION

Figure 1:
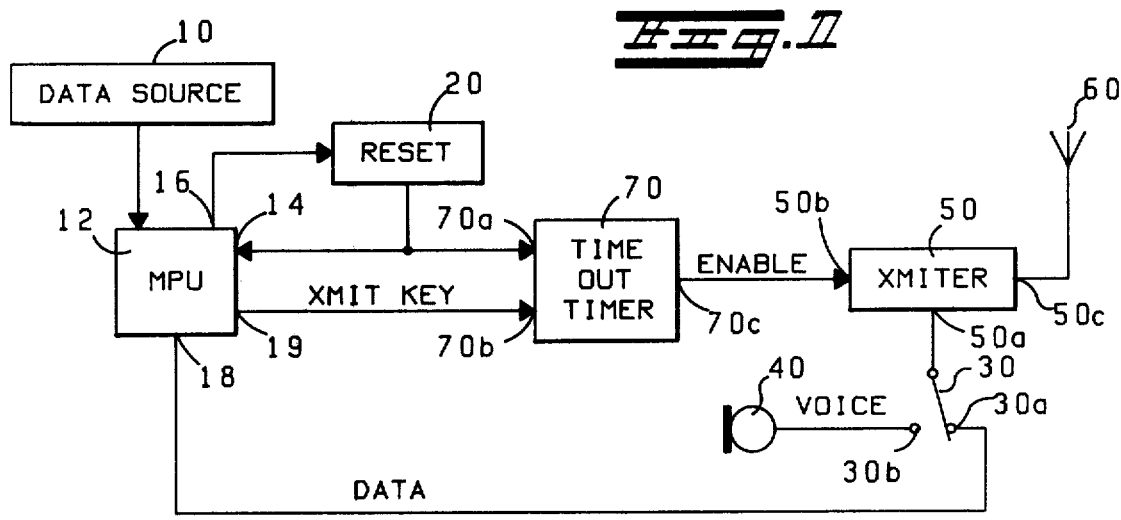
FIG. 1 is a block diagram illustrating application of the improved time out timer in a mobile data terminal.

FIG. 1 is a block diagram illustrating the essential features of a mobile data terminal. Included is a data source 10 which may be comprised, for example, of a user's keyboard. The data source feeds to a microprocessor unit 12. Any one of several microprocessing units commercially available may be employed. However, in this the preferred embodiment of the invention, an MPU 6800, available from Motorola, Inc., was used. Microprocessor 12 has an initialize, or reset input 14 to which is coupled a reset monostable multivibrator 20. During power turn on of the microprocessor 12, the reset monostable 20 produces an output pulse having a 500 millisecond duration which initializes the microprocessor unit 12. In addition, the reset circuitry 20 monitors the microprocessor 12 at a provided output 16 and produces a reset pulse if a fault in the operation of the microprocessing unit 12 is detected.

Data from data source 10 is processed by microprocessor 12 and passed to the microprocessor's data output terminal 18. There it is routed to one pole 30a of a switch 30, whose remaining pole 30b is connected to a source of voice information, such as a microphone and preamplifier 40. The switch 30 selects whether data or voice information is routed to the modulation input 50a of a conventional radio transmitter 50. Transmitter 50 is provided with an enable input 50b and an output 50c which couples to an antenna 60. Upon receipt of a suitable enable signal at its enable input 50b the transmitter 50 broadcasts the information received at its input 50a over a provided antenna 60.

Microprocessor 12 is also provided with a transmit key output 19. The microprocessor 12 is programmed such that when its data is to be transmitted, the transmit key output 19, which is normally at a high logic level, drops to a low logic level and remains at the low level for the duration of the transmission.

The reset circuit 20 output and the transmit key output 19 feed to inputs 70a, 70b, respectively of the inventive time out timer apparatus 70. The time out timer 70 is provided with an output 70c which supplies an enable pulse to enable input 50b of transmitter 50.

While the detailed operation of the time out timer 70 is given more fully hereinbelow with respect to FIG. 2, its basic operation may be understood as follows. Apparatus within time out timer 70 monitors both the continuous duration, and the average duty cycle over a predetermined period of repeated transmit key signals from transmit key output 19 of microprocessor 12. If the duration of any message exceeds a predetermined limit, or if the average duty cycle over a predetermined period of repeating transmit key signals exceeds predetermined limits, the time out timer output 70c automatically disables the transmitter 50.

The reset input 70a of time out timer 70 performs two functions. First, during the power up condition of the microprocessor 12 the generated reset pulse from reset 20 causes time out timer 70 to disable transmitter 50 for the duration of the reset time interval. In addition, if the time duration of a transmission, or the average duty cycle of repeated transmitter keying exceeds the predetermined limits and the transmitter has been disabled, the time out timer 70 maintains the transmitter in the disabled mode until the subsequent occurrence of a generated reset pulse. In general, an excessively long transmission time, or excessive repetition of transmission keying signifies a fault in the microprocessor 12. The reset circuit 20 senses this fault and it reinitializes the microprocessor 12. During the time of the microprocessor fault condition, however, the time out timer 70 disables the transmitter 50 thereby assuring that erroneous information is not being transmitted and that the data terminal which is suffering the microprocessor fault does not tie up an available communication channel.

Figure 2:
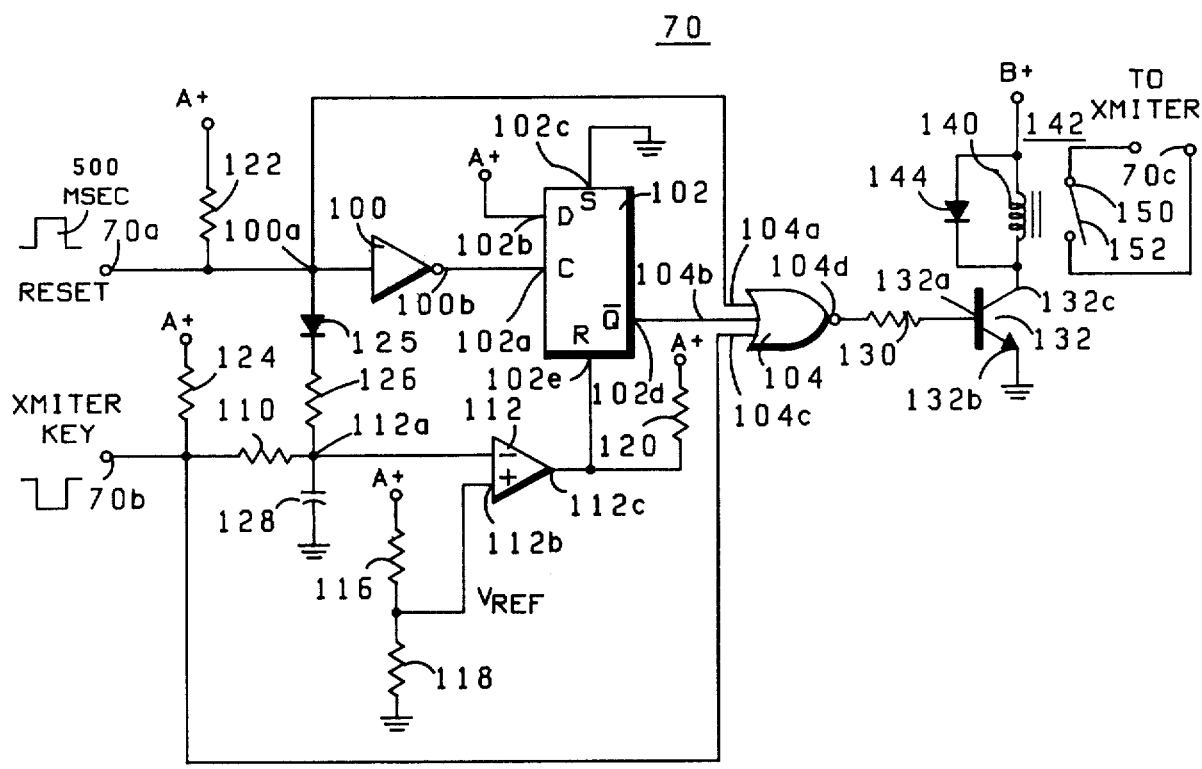
FIG. 2 is a detailed schematic diagram of the preferred embodiment of the improved time out timer.

FIG. 2 is a detailed schematic diagram illustrating the preferred embodiment of the time out timer 70 of FIG. 1. Here, the reset pulse, which is a high logic level having a duration of 500 milliseconds, couples to the time out timer first input 70a. The input 70a is coupled to the input 100a of an inverter 100. The output 100b of inverter 100 connects to the clock input 102a of a D type flip-flop 102. The D input 102b of flip-flop 102 connects to a source of DC bias A+ whereas the set (S) input 102c connects to ground potential. The Q output 102d of flip-flop 102 connects to one of three inputs 104a–104c of a conventional NOR gate 104. The reset pulse appearing at reset input 70a and the transmit key input appearing at the transmit key 70b both couple to the remaining inputs of NOR gate 104.

The transmit key input 70b also couples through a series coupling resistor 110 to the inverting input 112a of an operational amplifier 112. Applied to the non-inverting input 112b of amplifier 112 is a reference voltage, Vref, obtained from the common node of a voltage divider comprised of series resistors 116, 118 which couple between the source of DC bias A+ and ground potential.

The output 112c of amplifier 112 connects to the reset input 102e of D flip-flop 102 and, through a tie up resistor 120, to A+. Tie up resistors 122, 124 also connect the reset 70a and transmit key 70b inputs to the supply, A+.

A series connected diode 125 and resistor 126 connect between the input 100a of inverter 100 and the inverting input 112a of amplifier 112. An integrating capacitor 128 connects between the inverting input 112a of inverter 112 and ground potential.

The output 104d of NOR gate 104 connects through a current limit resistor 130 to the base 132a of an NPN transistor 132. The emitter 132b of transistor 132 connects to ground, and its collector 132c connects through the coil 140 of a relay 142 to an additional source of DC bias, B+. Damping diode 144 shunts the field 140 in the conventional manner. Upon activation of transistor 132 by NOR gate 104, current is drawn to the field 140 and the relay's contacts 150, 152 are closed thereby activating the transmitter (not shown).

Operation of the circuit shown in FIG. 2 may be understood as follows. During the power up interval, a reset pulse, at reset input 70a, through NOR gate 104 maintains transistor 132 in an off state, thus disabling the transmitter. Also, the reset pulse charges capacitor 128, through diode 124 and resistor 126, to the DC bias level, A+. Following the power up interval, the input 70a goes low and the D flip-flop 102 is triggered. With the transmit key input 70b at a high level, indicative of the non-transmission state, the capacitor is kept charged at the A+ value and the output of comparator 112 is low thereby maintaining flip-flop 102 in the set state.

Upon the microprocessor taking the transmit key level low, indicative of the transmit condition, NOR gate 104 is satisfied and its output 104d goes high thereby turning on transistor 132 and closing the relay contacts 150, 152 whereby the transmitter is activated. Also, capacitor 128 begins discharging through resistor 110. Normally, the transmission would end before capacitor 128 discharges below the threshold Vref of the comparator 112 and the transmit key input signal would go high thereby recharging capacitor 128. However, if the transmission takes an excessively long time, capacitor 128 will discharge below the reference level Vref and the output 112c of comparator 112 will go high. This resets the flip-flop 102 and immediately turns off transistor 132 and disables the transmitter. In addition, this condition locks out any future transmit key actuations until the occurrence of a reset pulse of reset input 70a.

Also, the values of capacitor 128, resistor 110 and A+ are selected such that an average duty cycle, over a period of repeated keying, above a predetermined limit will discharge capacitor 128 below the reference Vref thereby also resetting the flip-flop 102.

As with excessively long continuous transmissions, a high repetition transmission disable can only be reset by a reset pulse appearing at the reset input 70a. Thus, the transmitter is maintained in the disable mode until a reset pulse reinitializes the microprocessor 12.

It should further be noted that transmitter key up is inhibited if capacitor 128 shorts, or the A+ bias supply fails, or, for some reason, the reset circuit fails to generate a reset pulse.

In summary, an improved time out timer, particularly suited for mobile data terminal application has been described. The time out timer responds not only to the timed duration of a transmission but also to repeated of transmitter keying to disable transmitter action. In addition, the transmitter is disabled during the power on interval of an associated microprocessor and the disable condition is maintained until a reset pulse reinitializes the microprocessor.

While a preferred embodiment of the invention has been described in detail, it should be apparent that many modifications and variations thereto are possible, all of which fall within the true spirit and scope of the invention.

I claim:

1. A disable control circuit for a radio transmitter, said transmitter being both actuated and disabled by suitable actuation and disable control signals, comprising input means, for input of transmitter actuation control signals;

detection means for detecting the average duty cycle, over a period of time, of repeating transmitter actuation control signals, and for producing a disable signal in response to said average duty cycle exceeding a predetermined limit;

disable means, coupled to the detection means and the transmitter, for disabling the transmitter in response to said disable signal.

2. A disable control circuit of claim 1 wherein the detection means further comprises:

means for producing the disable signal in response to a continuous transmitter actuation control signal which remains continuous for predetermined time period.

3. The disable control circuit of claims 1 or 2 further comprising:

reset input means for input of a reset signal reset means, coupled to the reset input, for enabling the transmitter by resetting the disable means in response to a reset signal occurring when the transmitter is disabled.

* * * * *